Patented Apr. 7, 1936

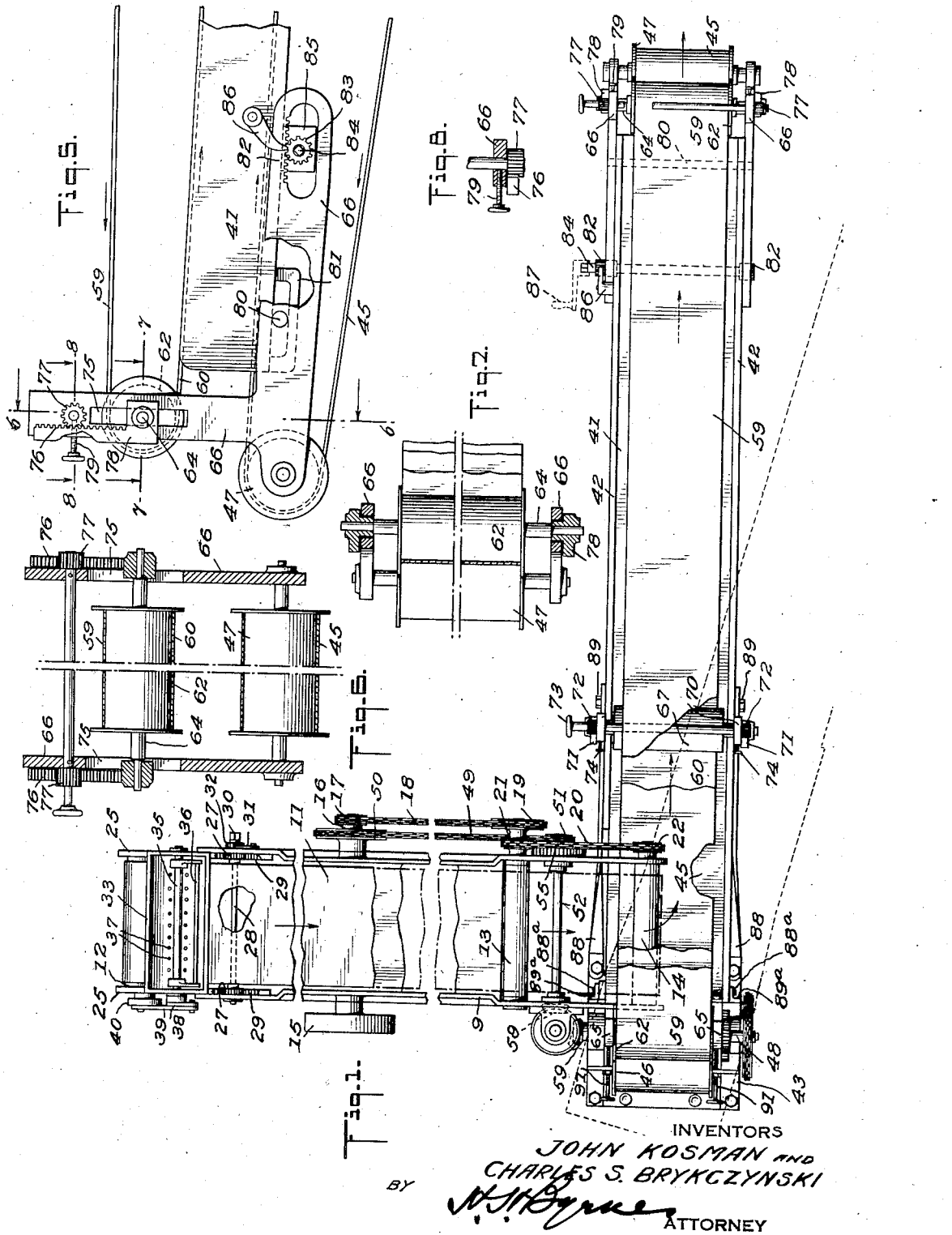

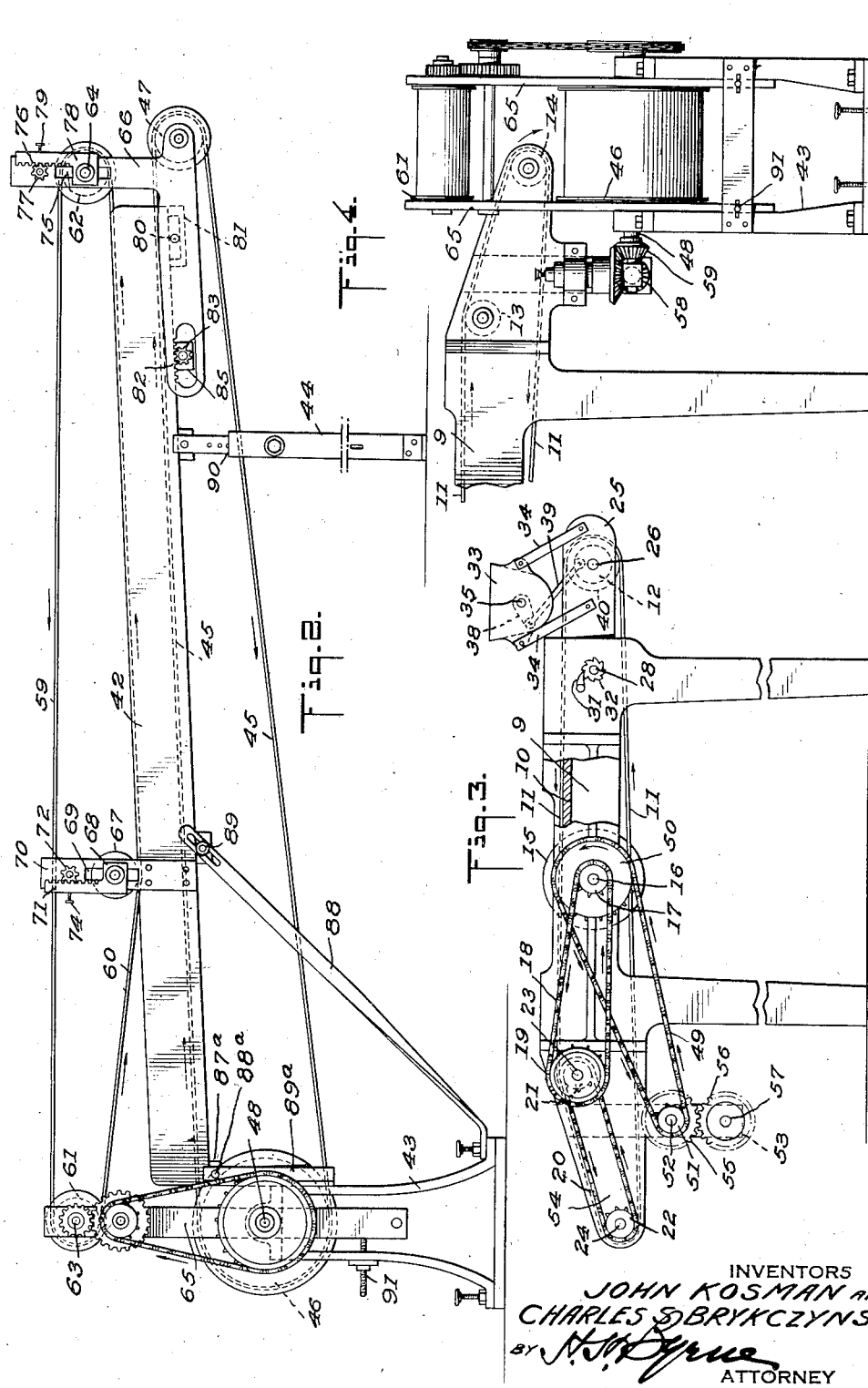

2,036,531

UNITED STATES PATENT OFFICE 2,036,531

CONVEYER APPARATUS FOR DOUGH-WORKING MACHINERY

John Kosman and Charles S. Brykczynski, New York, N. Y., assignors to Geo. F. Stuhmer & Company, Brooklyn, N. Y., a corporation of New York Application April 4, 1934, Serial No. 719,016

7 Claims. (Cl. 107—7)

The present invention relates to conveyer apparatus for dough-working machinery and consists in the combinations and arrangements of elements hereinafter described and particularly set forth in the accompanying claims.

The invention disclosed herein is proposed as a further improvement over the type and construction of conveyer apparatus shown in our co-pending application for U. S. Letters Patent on "Right angle driving mechanism", or "Conveyer apparatus for dough-working machinery", Serial No. 701,936, filed December 11, 1933, and to which reference may be had for more detailed particulars of those features of the apparatus which are common to both machines.

A further purpose of the invention is to provide an apparatus of the character stated which will enable the lumps of dough discharged from a dough divider to be received in considerably less space than heretofore, and which will combine the function of the receiving belt of a dough divider with that of its separating belt.

The invention has for a further object to provide an apparatus wherein the lumps of dough discharged from any one of a plurality of dough dividers may be delivered to any one of a plurality of dough rounders, dough molders or dough proofers, thus giving greater flexibility than has heretofore been obtainable, and preventing those losses consequent to the breaking down of a dough divider, dough rounder, or the like.

The invention has for a further object to provide an apparatus comprising a conveyer arranged to receive the dough from a dough divider, and a conveyer angularly related to said first or receiving conveyer adapted to carry the dough from the receiving conveyer to a dough rounder or the like, and operable while carrying the dough pieces to provide spaces therebetween so as to feed them individually to the rounder or other means.

More particularly the invention herein disclosed resides in the construction and adjustment features of the delivery conveyer and initial dough-shaping unit of the mechanism whereby said structure is more simplified, and can be more quickly and easily regulated or adjusted whereby to better suit the needs or conditions of the work in hand.

The invention is shown by way of illustration in the accompanying drawings wherein:

Figure 1 is a top plan view of the apparatus.

Figure 2 is a view in side elevation of the delivering and separating conveyer.

Figure 3 a view in side elevation and partly in vertical section of the receiving conveyer.

Figure 4 an elevational view showing the connecting portions of the receiving and delivering conveyers, and the gearing transmission therebetween.

Figure 5 an enlarged detailed view of the discharging end of the delivery conveyer.

Figure 6 a vertical sectional view on the line 6—6 of Figure 5.

Figure 7 a horizontal sectional view on the line 7—7 of Figure 5, and;

Figure 8 a horizontal sectional view on the line 8—8 of Figure 5.

Referring to the construction in detail, and wherein like reference characters designate the same parts in the different figures, the receiving conveyer (Figures 1 and 3) comprises a suitable supporting structure 9 having a lateral or base portion 10 over which travels in supporting relation an endless belt 11 which is located to receive the lumps of dough discharged from one or more dough dividing machines not shown. Said conveyer belt 11 is arranged to travel parallel with the dough dividers, and not angularly with relation thereto as is now the practice, thereby reducing to a minimum the space required to receive the dough from the dividers. The belt 11 is mounted to travel on pulleys 12, 13, and 14, suitably journalled in the supporting structure 9 and connected to be driven from pulley 15 which in practice is belted to an electric motor or other prime mover. Said pulley 15 is mounted on shaft 16 having thereon a sprocket wheel 17, driving chain 18 that connects with sprocket 19 of the belt roller 13. A chain and sprocket connection 20, 21, and 22 operates to drive the roller 14 from roller 13, said sprockets 21 and 22 being mounted respectively on shafts 23 and 24 of said rollers 13 and 14.

The receiving end of the belt conveyer 11 is rendered adjustable by extensible side portions 25 on which is journalled the shaft 26 of roller 12, and the means (Figure 1) for adjusting said members 25 consists of pinions 27 on shaft 28 that engage with racks 29 on said extensible side members 25. A squared end 30 of the shaft 28 is adapted to receive any suitable adjusting tool, and a pawl-and-rachet (31—32) serves to secure the extensible frame in adjusted position.

To prevent the received lumps of dough from adhering to the conveyer belt 11 (Figure 3), the upper run of said belt is adapted to be coated or surfaced with a sprinkling of flour by means comprising a hopper or trough 33, supported above the receiving end of the upper run of the belt by suitable bracket arms 34 that are pivotedly mounted on said extensible members 25 as clearly shown. A shaft 35, journalled in the hopper, is provided with an agitating device 36 (Figure 1) which operates to cause the flour to discharge through openings 37 in the bottom of the hopper on to the belt 11. Said agitator shaft 35 is actuated from the pulley shaft 26 by crank arm 38 and pitman 39, connecting said crank arm with a disc 40 on shaft 26 (see Figure 3).

The lumps of dough deposited on the receiving conveyer belt 11 are delivered to a separator and conveyer by which it is also initially shaped preparatory to delivery to a dough rounder, dough molder, dough proofer, or the like, not shown. This delivering, separating, and initial loaf-forming conveyer comprises a trough-like structure disposed at right angles to the receiving conveyer (see Figure 1), and embodies a base or shelf portion 41 having side portions 42 of appreciable length whereby to give the requisite further shaping or forming of the dough pieces during the interval of passing thereon, as will be understood.

The delivering and separating conveyer embodies an endless belt 45 having supporting contact with the bottom 41 of the trough, and travels over pulleys 46 and 47 at a speed appreciably higher than the speed of the receiving belt 11 whereby the delivered lumps of dough have appreciable spaces therebetween, and which spacing facilitates the dough-shaping operation to be further explained. The driving pulley 46 is journalled on shaft 48 mounted in the standard 43, and is connected to be driven from the shaft 16 of the prime mover. Said transmission consists of a chain 49 (Figures 1 and 3) connecting sprockets 50 and 51 mounted on shafts 16 and 52 respectively. The shaft 52 is journalled in arms 53 dependingly mounted on the extension 54 of the conveyer supporting structure 9. Pinion 55 on shaft 52 meshes with pinion 56 on adjacent shaft 57, having on its opposite ends a bevel-gear 58 meshing with bevel-gear 59 on shaft 48 of the larger and belt driving pulley 46.

The delivery conveyer belt 45 cooperates with a similar and endless belt 59 whose lower length 60 travels appreciably near or close to the carrying or loaf supporting belt length 45, and said upper belt (59—60) is geared to run at a speed appreciably greater than the belt 45 to effect a further spacing of dough lumps on belt 45 to effect a preliminary shaping of the dough pieces before they are delivered to the dough rounder, dough molder or dough proofer, not shown. The accelerated or faster speed belt (59—60) is mounted to travel on pulleys 61 and 62 of shafts 63 and 64 journalled in the lever arms or uprights 65, and extensible trough end section 66 respectively. A guiding or depressing roller 67 has contact with the lower or dough engaging length 60 of the loaf-forming belt, and said roller 67 is so positioned with respect to the pulleys 46 and 47 that a substantially large clearance or opening is provided at the receiving end of the belt 45, or at that place which is immediately beneath the discharging end of the receiving conveyer (Figures 1 and 4).

The depressing or guiding roller 67 is adjustably mounted by means of bearing brackets 68, slots 69 in arms 70, and a rack-and-pinion device (71—72) having the knob or knurled head 73. Thumb screws 74 serve to secure the roller 67 in set position. In like manner the pulley 62 of belt (59—60) is rendered adjustable by its shaft 64 in slots 75 of the extensible frame or trough end section 66, through a rack-and-pinion device 76—77 and bearing brackets 78. Set screws 79 serve for fixing said adjustment.

The extensible trough end section 66 comprises two similar side portions or arms connected by a cross bar 80, having limited sliding movement in brackets 81 secured to the under side of the trough base 41 as shown in Figure 5, and racks 82 on said arms 66 are engaged by pinions 83 on shaft 84 journalled in bearing blocks 85 on the trough bottom. A pawl 86 engaging one of the pinions 83 serves to hold the movable or end frame section in the position set by adjusting crank 87.

The supporting means for the loaf-shaping and delivery conveyer comprises a cross-bar 87a having pivoted bearings 88a in the side bars 89a of the standard 43. Said support provides for vertical adjustment of the conveyer through the lever arms or uprights 65 fulcrumed on the shaft 48, and set screws 91 mounted in said standard and impinging the lever arms as shown. Further and leveling adjustment of the conveyer is obtained by means of the diagonal brace bars 88 having slot and bolt connections 89 with the conveyer trough immediately adjacent the guide roller supporting arms 70 (Figure 2). The two trough props 44 having telescope features 90 may be readily adjusted to the position at which the trough structure is set for operation.

The adjusting means for the two belts 45 and 59—60 of the conveyer is similar to that in our co-pending application aforesaid. That is to say, the upright lever-arms 65 supporting said belts are angularly adjusted by the thumb screws 91 that impinge against said lever arms and serve to move the same about the shaft 48 forming the fulcrum therefor.

The angular relation of the receiving, delivering and dough-shaping belts enables dough rounders, dough molders or dough proofers to be fed without the use of an auxiliary separator, as more fully explained in our co-pending application above referred to. And as the carrying and dough separating belts 45 and 59—60 may be moved into different angular positions with relation to the receiving belt 11, the lumps of dough being delivered by divider No. 1 may be fed to rounder No. 1 or rounder No. 2; or the lumps of dough being delivered by divider No. 2 may be fed to rounder No. 2 or rounder No. 1, thus making the equipment flexible and preventing losses as the result of breakdown of one of the machines of the equipment. The major portions of the carrying and separating belts 45 and 60 are arranged in relatively close parallel relation and contact with the lumps of dough and therefore said lumps are positively delivered from these belts in any inclined position to which they may be adjusted to serve a dough rounder, dough molder or dough proofer.

From the foregoing it will be apparent that the belt 11 conveys the dough from a divider to and between the belts 45 and 60, that said belts 45 and 60 convey said lumps to a dough rounder, dough molder or dough proofer, and that the belts 45 and 60, owing to their movement in the same direction at different speeds, separate the lumps of dough and subject them to preliminary working or forming action before delivery to the rounder. The separation of the dough pieces by the belts 45 and 60, and their consequent successive delivery in spaced relation, permits the succeeding operations, to which the dough is subjected, to take place on individual lumps rather than on all of the lumps at the same time.

It will be understod the invention as herein disclosed is not limited to the details of construction shown and described, and that these may be varied widely without departing from the spirit of the invention as defined by the claims.

What is claimed as new is:

1. In a conveyer apparatus the combination of a suitable support, a trough-like structure mounted on said support, an extensible section at the discharge end of said trough, belt pulleys journalled in said extensible section and on the supporting structure, endless belts mounted on said pulleys respectively and designed to operate at relatively different speeds, and a guide roller on the trough-structure holding one belt length in relatively close proximity to the adjacent belt length, as and for the purpose set forth.

2. In a conveyer apparatus the combination of a suitable support, a trough-like structure mounted on said support, an extensible section mounted at the discharge end of the trough, an upper and a lower belt pulley journalled in said extensible section, belt pulleys journalled in the support, endless belts mounted on said pulleys respectively and designed to operate at relatively different speeds, and a guide roller on the trough structure holding one belt length in relatively close proximity to the adjacent belt length and devices for vertically adjusting said upper pulley and the guide roller whereby to regulate the working distance between the adjacent lengths of said belts, as and for the purpose set forth.

3. In a conveyer apparatus the combination of a suitable support, a trough-like structure mounted on said support, an extensible section mounted at the discharge end of the trough, belt pulleys journalled in said extensible section and on the support, a rack-and-pinion device providing adjustment for said extensible section, said extensible section having upright portions; bearing brackets mounted on said upright portions, rack-and-pinion gearings for vertically adjusting said bearing brackets, endless belts journalled on said pulleys respectively and designed to operate at relatively different speeds, and a guide roller on the trough structure holding one belt length in close proximity to the adjacent belt length, as and for the purpose set forth.

4. In a conveyer apparatus the combination of a suitable support, a trough-like structure mounted on said support, slotted brackets mounted on the trough structure at the discharge end thereof, an extensible section comprising arms having a connecting cross bar adjustably mounted in the slots of said brackets, rack-and-pinion devices for adjusting said extensible section and holding the same in set position; said section having upright portions, bearing brackets adjustably mounted on the upright portions of said section, a pulley journaled in said bearing brackets, a rack-and-pinion device for adjusting said bracket bearings, and belt pulleys journalled on the support, in the extensible section, and in the bearing brackets, endless belts journalled on said pulleys respectively and designed to operate at relatively different speeds, and a guide roller on the trough structure holding one belt length in relatively close proximity to the adjacent belt length, as and for the purpose set forth.

5. In a conveyer apparatus the combination of a suitable support, a trough-like structure adjustably mounted on said support, a section longitudinally adjustable on the trough structure at the discharge end thereof, said adjustable section having upright portions, journal brackets mounted on said upright portions, belt pulleys journalled on the support, in said adjustable end section and on the brackets thereof, and rack and pinion devices for adjusting said end section and journal brackets and holding the same in set position, and cooperable belts mounted to travel on said pulleys respectively, substantially as set forth.

6. In a conveyer apparatus the combination of a suitable support, a trough-like structure adjustably mounted on said support, slotted brackets mounted on the trough-structure adjacent the discharge end thereof, a trough end section comprising arms having upright portions, said arms having racks, a cross bar connecting said arms mounted in said brackets; a shaft journalled on the trough structure adjacent said slotted brackets, pinions on said shaft engaging with said arm racks, devices for holding said trough rack and pinions in adjusted position, bearing brackets mounted on the upright portions of said end section, a shaft journalled in said bearing brackets, rack-and-pinion devices for adjusting and holding said bearing brackets in adjusted position, pulleys journalled on the support, the end section, and in said bearing brackets; and cooperable conveyer belts mounted to travel on said pulleys respectively, substantially as set forth.

7. In a conveyer apparatus the combination of a suitable support, pulleys journalled on said support, a trough-like structure adjustably mounted on the support, an extensible section adjustable longitudinally of the trough at the discharge end thereof, upper and lower belt pulleys mounted on said adjustable section, co-operable belts mounted on said support and section pulleys respectively, a device for moving the extensible section whereby to adjust the longitudinal tension on both of said belts simultaneously, and a device on the extensible section for adjusting the upper pulley thereon whereby to regulate the working distance between the adjacent lengths of said belts, as and for the purpose set forth.

JOHN KOSMAN.
CHARLES S. BRYKCZYNSKI.